United States Patent
Koenke

(10) Patent No.: US 12,397,421 B2
(45) Date of Patent: Aug. 26, 2025

(54) CONTACT FORCE OVERSHOOT MITIGATION IN PNEUMATIC FORCE CONTROL DEVICES

(71) Applicant: ATI Industrial Automation, Inc., Apex, NC (US)

(72) Inventor: Samuel Koenke, Cary, NC (US)

(73) Assignee: ATI Industrial Automation, Inc., Apex, NC (US)

( * ) Notice: Subject to any disclaimer, the term of this patent is extended or adjusted under 35 U.S.C. 154(b) by 190 days.

(21) Appl. No.: 18/081,072

(22) Filed: Dec. 14, 2022

(65) Prior Publication Data

US 2023/0191598 A1  Jun. 22, 2023

Related U.S. Application Data

(60) Provisional application No. 63/292,468, filed on Dec. 22, 2021.

(51) Int. Cl.
*B25J 9/16* (2006.01)
*G05D 15/01* (2006.01)

(52) U.S. Cl.
CPC ............ *B25J 9/1633* (2013.01); *G05D 15/01* (2013.01)

(58) Field of Classification Search
CPC .................. B25J 9/1633; G05D 15/01; G05B 2219/37405; G05B 2219/39322
USPC ......................................................... 700/260
See application file for complete search history.

(56) References Cited

U.S. PATENT DOCUMENTS

| | | |
|---|---|---|
| 7,312,615 B2 | 12/2007 | Perry |
| 9,375,840 B2 | 6/2016 | Naderer et al. |
| 9,993,922 B2 | 6/2018 | Naderer et al. |
| 2018/0210434 A1* | 7/2018 | Iwatake .............. G05B 19/423 |

(Continued)

FOREIGN PATENT DOCUMENTS

| | | | | |
|---|---|---|---|---|
| CN | 101390027 A | * | 3/2009 | ............ B25J 13/085 |
| CN | 101195221 B | * | 7/2011 | ............ B25J 9/1633 |

(Continued)

OTHER PUBLICATIONS

Bing et al. (CN112658808.translate); Harbin Inst Technology Shenzhen; Force/position coupling compliant polishing control method and compliantpolishing control system (Year: 2021).*

(Continued)

*Primary Examiner* — B M M Hannan
(74) *Attorney, Agent, or Firm* — COATS & BENNETT, PLLC

(57) ABSTRACT

A force control device mitigates or eliminates impact force overshoot upon contact between a robotic tool and a workpiece. Contact is detected while operating the force control device in a position control mode, according to either of a steady state search method or a transient search method. The force applied to the workpiece upon contact is less than a predetermined setpoint force. Upon detecting contact, the force control device performs a bumpless transfer to a force control mode. In force control mode, the force control device ramps the contact force to the predetermined setpoint. The force ramp may be linear, or along a user-defined trajectory. The stiffness of the force control device is different in position and force control modes, controlled by backpressure in a pneumatic cylinder.

33 Claims, 16 Drawing Sheets

(56) References Cited

U.S. PATENT DOCUMENTS

| | | | |
|---|---|---|---|
| 2018/0354128 A1 | 12/2018 | Naderer et al. | |
| 2020/0306865 A1* | 10/2020 | Motohashi | B25J 11/005 |
| 2021/0078135 A1 | 3/2021 | Naderer | |
| 2021/0402596 A1* | 12/2021 | Karito | B25J 9/1633 |
| 2023/0032334 A1* | 2/2023 | Hane | B25J 9/161 |
| 2024/0173858 A1 | 5/2024 | Naderer | |

FOREIGN PATENT DOCUMENTS

| | | | | |
|---|---|---|---|---|
| CN | 209831270 U | * | 12/2019 | ............ B24B 29/00 |
| CN | 112658808 A | * | 4/2021 | |
| CN | 112809537 A | * | 5/2021 | |
| CN | 112658808 B | * | 7/2022 | |
| DE | 102010003697 B4 | | 12/2012 | |
| DE | 102012206503 A1 | * | 10/2013 | ............ B25J 9/1633 |
| DE | 102012206503 B4 | * | 10/2015 | ............ B25J 9/1633 |
| DE | 102011006679 B4 | | 7/2018 | |
| DE | 102015104164 B4 | | 5/2019 | |
| DE | 102018106086 A1 | | 9/2019 | |
| DE | 102019105022 B3 | | 3/2020 | |
| DE | 102021106990 A1 | | 9/2022 | |
| JP | 2020163517 A | * | 10/2020 | ............ B23K 11/11 |
| JP | 7364696 B2 | * | 10/2023 | ............ B25J 9/1671 |

OTHER PUBLICATIONS

Lange Friedrich (DE102012206503A1.translate); Deutsch Zentr Luft & Raumfahrt; Method for performing force and moment control of robot system, involvesdetermining target position of tool midpoint based on actual position, notionalvectorial spacing and notional vectorial target spacing. (Year: 2013).*

Li et al. (CN112809537A . . . translate); Shenzhen Sendiyuan Pneumatic Equipment MFT Co Ltd.; Fine polishing machine for workpiece raw material treatment (Year: 2021).*

Chen (CN209831270U.translate); Shanghai ASD Robot Co Ltd.; Large polishing machine. (Year: 2019).*

* cited by examiner

CONTACT FORCE OVERSHOOT MITIGATION IN PNEUMATIC FORCE CONTROL DEVICES

RELATED APPLICATIONS

This application claims the benefit of U.S. Provisional Application No. 63/292,468, filed 22 Dec. 2021, the disclosure of which is incorporated herein by reference in its entirety.

FIELD OF DISCLOSURE

The present disclosure relates generally to robotics, and in particular to mitigation of force overshoot in pneumatic robotic force control devices, upon contact with a workpiece.

BACKGROUND

Robots are an indispensable part of manufacturing, testing, assembly, and packing of products; assistive and remote surgery; space exploration; operation in hazardous environments; and many other applications. Many robots, or tool attached thereto, measure forces (including torques) applied by contact with a workpiece or the environment, or experienced by the robotic as a result of such contact. These forces are fed back to the robotic control system, which controls the position and/or movement of the robot based, at least in part, to control the force. Such systems are known as force control devices. Examples include material removal (grinding, sanding, and the like), automated parts placement, remote digging or other manipulation of the environment, and the like. Without loss of generality, the present disclosure will consider material removal tools as a representative case of the need for, and design of, robotic force control devices.

In many manufacturing processes, the basic dimensional shapes of parts are achieved by machining, casting, forging, molding, or similar processes. These processes are sufficient to meet dimensional specifications, but the parts require additional processing to achieve a desired surface finish. For example, machined parts may require that residual marks and scallops be removed. As another example, parts that are injection molded, cast, or forged may have flashing, gates, and/or parting lines that must be removed. Robotic material removal tools are often used to achieve these finishing operations.

For a variety of reasons, such as the stiffness of a robot arm, the achievable granularity of its robotic positioning, and the like, real-time force adjustments are difficult or impossible to achieve in real-world material removal operations. Accordingly, compliant force control devices are known in the art. A force control device is an assembly interposed between the robot arm and a material removal tool (sander, grinder, etc.), which allows some compliance, or movement of the material removal tool relative to the robot arm—also referred to as "give" or "slack." A compliant force control device allows the material removal tool to follow slight changes in contours of a workpiece, while the programmed robot path is a straight line. One known mechanism for providing force control compliance is a pneumatic cylinder.

In some respects, the state of the art of robotic material removal still strives to mimic human performance. FIG. 1 plots measured force applied by a human operator to a workpiece in the course of material removal. The curve on the left plots the force when applying rotary oscillation with hand-held sandpaper. The curve on the right plots the force applied in linear oscillation with sandpaper in a sanding block. As these curves show, a human operator is well able to regulate the increase in applied force as the material removal process begins.

Initial contact of a robotic material removal tool with a workpiece—even through a compliant force control device—typically includes an impact force overshoot, which may result in poor finish quality, or even damage to the workpiece.

The Background section of this document is provided to place aspects of the present disclosure in technological and operational context, to assist those of skill in the art in understanding their scope and utility. Unless explicitly identified as such, no statement herein is admitted to be prior art merely by its inclusion in the Background section

SUMMARY

The following presents a simplified summary of the disclosure in order to provide a basic understanding to those of skill in the art. This summary is not an extensive overview of the disclosure and is not intended to identify key/critical elements of aspects of the disclosure or to delineate the scope of the disclosure. The sole purpose of this summary is to present some concepts disclosed herein in a simplified form as a prelude to the more detailed description that is presented later.

According to one or more aspects described and claimed herein, a force control device mitigates or eliminates impact force overshoot upon contact between a robotic tool and a workpiece. Contact is detected while operating the force control device in a position control mode, according to either of a steady state search method or a transient search method. The force applied to the workpiece upon contact is less than a predetermined setpoint force. Upon detecting contact, the force control device performs a bumpless transfer to a force control mode. In force control mode, the force control device ramps the contact force to the predetermined setpoint. The force ramp may be linear, or along a user-defined trajectory. The stiffness of the force control device is different in position and force control modes, controlled by backpressure in a pneumatic cylinder.

One aspect relates to a method of controlling a robotic force control device comprising a robotic tool. In a position control mode, the robotic tool is positioned along a compliance stroke of the force control device, away from a mechanical stop in the force control device. At least one of the robotic tool and a workpiece are moved towards each other. Contact between the robotic tool and the workpiece is detected. A bumpless transfer is performed from position control mode to force control mode. In force control mode, a force applied by the robotic tool to the workpiece to a force setpoint is increased to a force setpoint. A force applied by the robotic tool to the workpiece at contact is less than the force setpoint.

Another aspect relates to a force control device having compliance motion and configured to hold a robotic tool and apply the robotic tool against a workpiece with a desired force. The force control device includes a controller operative in a position control mode to position the robotic tool along a compliance stroke of the force control device, away from a mechanical stop in the force control device; and as at least one of the robotic tool and the workpiece move towards each other, detect contact between the robotic tool and the workpiece. The controller is further operative in a force control mode to increase a force applied by the robotic tool to the workpiece to a force setpoint. The controller is configured to perform a bumpless transfer from position control mode to force control mode. A force applied by the robotic tool to the workpiece at contact is less than the force setpoint.

BRIEF DESCRIPTION OF THE DRAWINGS

The present disclosure will now be described more fully hereinafter with reference to the accompanying drawings, in which aspects of the disclosure are shown. However, this disclosure should not be construed as limited to the aspects set forth herein. Rather, these aspects are provided so that this disclosure will be thorough and complete, and will fully convey the scope of the disclosure to those skilled in the art. Like numbers refer to like elements throughout.

DETAILED DESCRIPTION

For simplicity and illustrative purposes, the present disclosure is described by referring mainly to an exemplary aspect thereof. In the following description, numerous specific details are set forth in order to provide a thorough understanding of the present disclosure. However, it will be readily apparent to one of ordinary skill in the art that the present disclosure may be practiced without limitation to these specific details. In this description, well known methods and structures have not been described in detail so as not to unnecessarily obscure the present disclosure.

Figure 2:
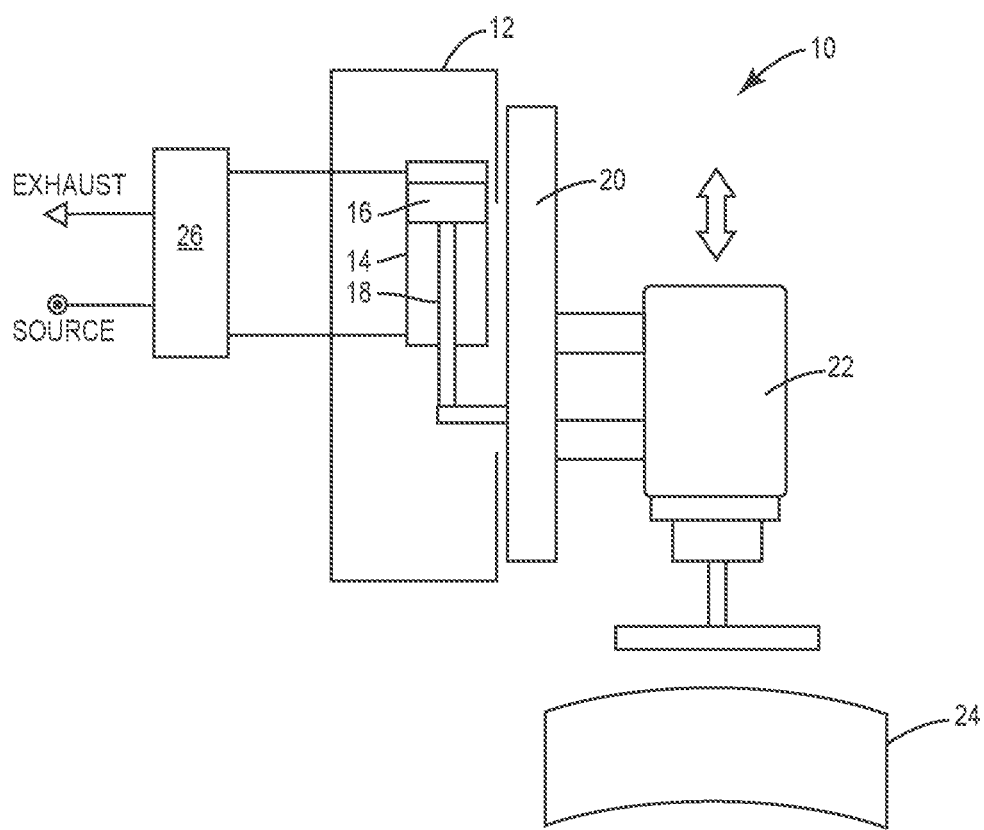
FIG. 2 is a diagram of a compliant force control device for a robotic material removal tool.

FIG. 2 depicts a simplified view of a representative compliant robotic force control device (FCD) 10, comprising a housing 12, pneumatic cylinder 14 containing a pneumatic piston 16 and rod 18, and a linear carriage 20 connected to the rod 18. A material removal tool 22 is connected to the carriage 20. As the material removal tool 22 interacts with a workpiece 24, it may move linearly along a normal axis, as indicated by the motion arrow. The carriage 20, and hence the robotic tool 22, can move linearly between extents in either direction, referred to herein as a "stroke" of the FCD 10. At least the forward extent of the stroke is defined by a mechanical stop. A pneumatic control system 26 regulates the force applied to the work piece 24 by the material removal tool 22, and provides for compliance motion of the material removal tool 22, by regulating the pressure in chambers of the cylinder 14 on both sides of the piston 16.

Analysis of the impact force overshoot proceeds from consideration of the position of a material removal tool 22 before, at, and following initial contact with a workpiece 24. It is known that elastic deformations in the tool or workpiece surface can help reduce the impact energy. The analysis assumes the impact state where tool and workpiece are considerect and thus comprising a worst case contact event.

Figures 3A, 3B, 3C:
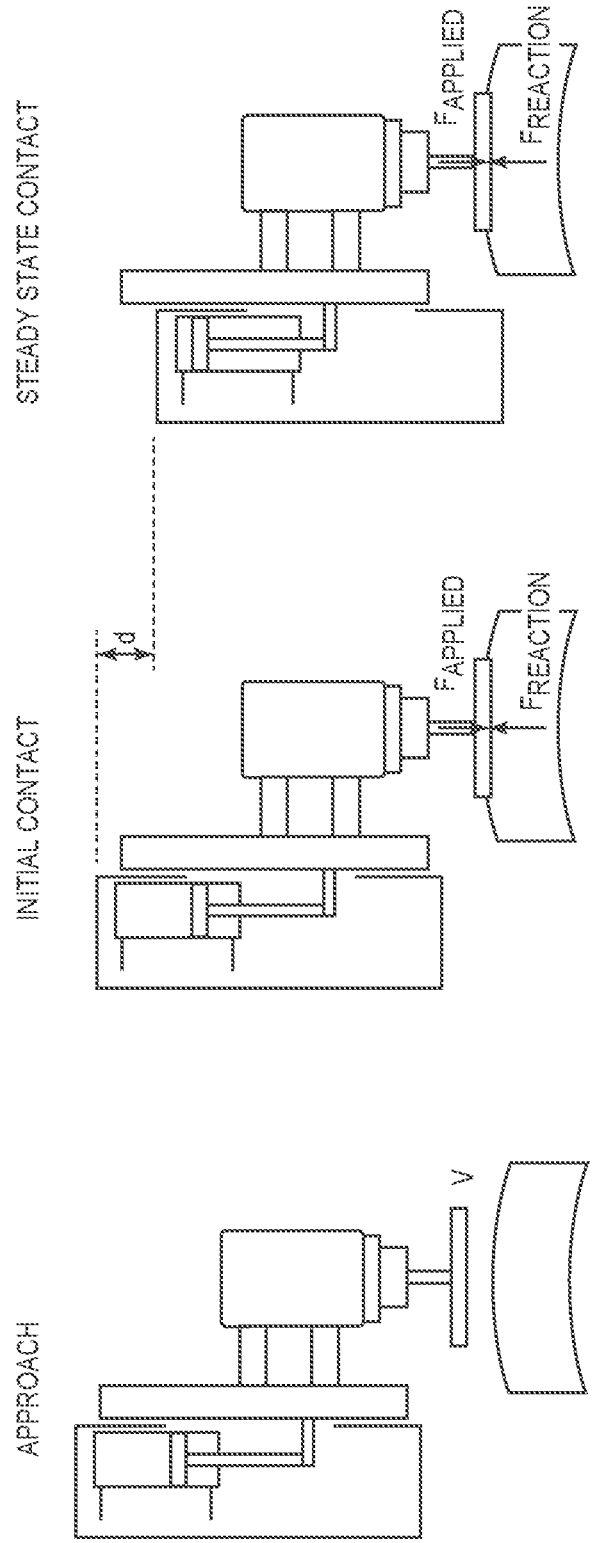
FIG. 3A is a diagram of the approach of a robotic material removal tool to a workpiece.
FIG. 3B is a diagram of initial contact between the robotic material removal tool and the workpiece.
FIG. 3C is a diagram of steady state contact between the robotic material removal tool and the workpiece.

FIG. 3A shows the robotic material removal tool 22 approaching a workpiece 24 with relative velocity v. This is known as process to part (workpiece) motion, and is assumed herein. Of course, the same analysis applies to part to process motion, where the tool 22 is stationary, and the workpiece 24 is moved into contact with it. Prior to contact, the piston 16 is positioned generally forward in the pneumatic cylinder 14, allowing for compliance motion of the material removal tool 22.

FIG. 3B depicts initial contact between the material removal tool 22 and the workpiece 24, generating equal and opposite applied and reactive forces. Although the material removal tool 22 stops at this point, relative motion of the force control device housing 12 continues.

FIG. 3C depicts a steady state contact between the material removal tool 22 and the workpiece 24. Note that the force control device housing 12 is displaced a distance d relative to its position at initial contact (FIG. 3B); the piston 16 is displaced within the pneumatic cylinder 14 the same distance. Relative velocity between the force control device 10 and the workpiece 24 is now zero.

Figure 4:
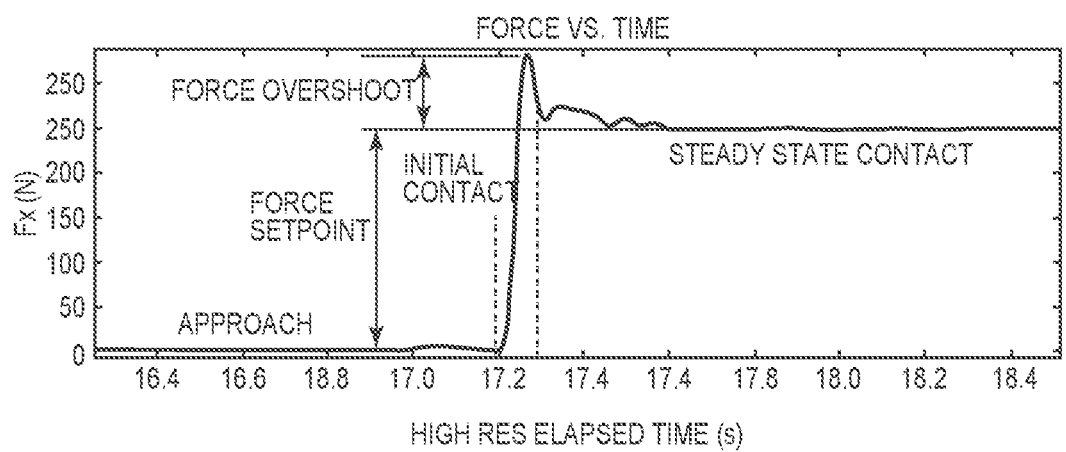
FIG. 4 is a graph of force applied by the robotic material removal tool to the workpiece over the positions depicted in FIGS. 3A-C.

FIG. 4 graphs the force between the material removal tool 22 and the workpiece 24 as their relative positions transition through the stages depicted in FIGS. 3A-C. Initially, during approach (FIG. 3A), the force is zero. A peak force occurs immediately following initial contact (FIG. 3B). The peak force comprises the desired steady state force (also known as the set point force), and a force overshoot. The force overshoot is often detrimental, and always undesired.

The force overshoot results primary from two force sources. The first of these results from dynamics of the force control device 10, and is modeled by equation (1):

$$F_{force\,control\,device} = m\frac{dv}{dt} - \beta v \quad (1)$$

Figure 5:
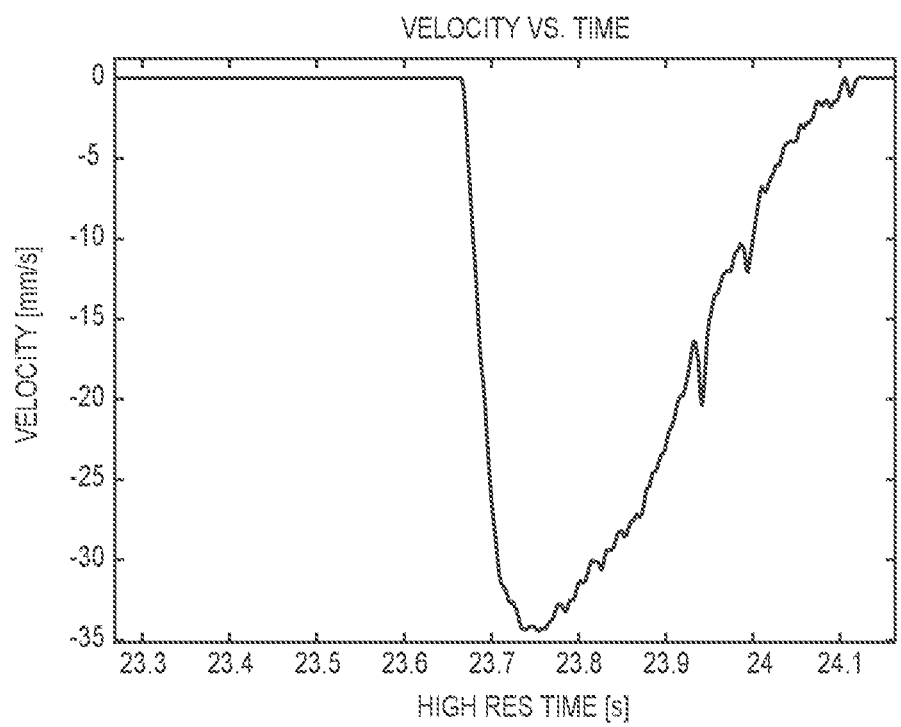
FIG. 5 is a graph of the velocity of a force control device carriage vs. time over the course of initial contact between a robotic material removal tool to a workpiece.

The first term in equation (1) represents the change in linear momentum of the force control device housing 12 upon the material removal tool 22 contacting the workpiece 24. FIG. 5 graphs the rapid changes in velocity of the force control device housing 12, relative to the carriage 20 and tool 22, over the duration of the force overshoot.

The second term in equation (1) relates a frictional force caused by the motion of the force control device housing 12 and viscous friction in moving components. Because most force control devices 10 strive to minimize friction in the system, so as to maximize various performance aspects, the first term in equation (1) dominates, and the second term can be disregarded.

Figure 6:
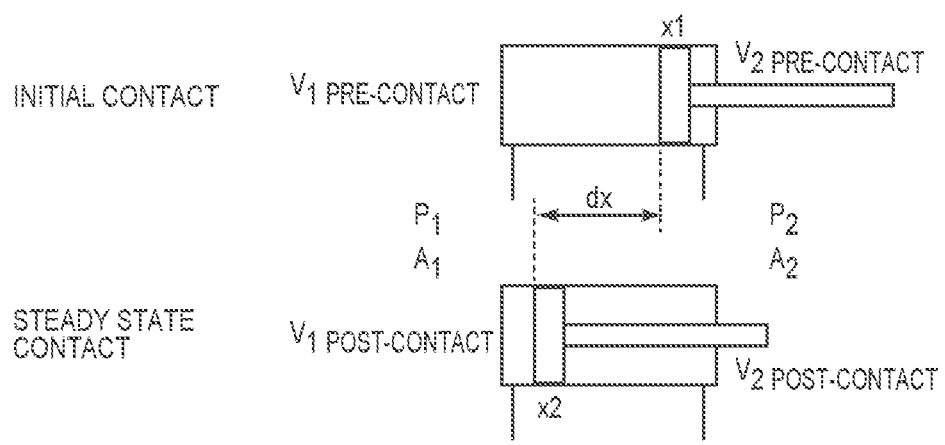
FIG. 6 shows initial and steady state positions of a piston within a pneumatic cylinder.

The second cause of the force overshoot is pressure dynamics in the pneumatic cylinder 14. FIG. 6 demonstrates the change in pressures, resulting from volume changes in the chambers, that drive this dynamic. At the instant of initial contact (FIG. 3B), the carriage 20 is positioned such that cylinder piston 16 is in position x1. Upon contact of the material removal tool 22 with the workpiece 24, the relative motion difference between the workpiece 22 and force control device housing 12 drives the carriage 20 to a settling position x2. The change in carriage 20 position, and thus cylinder piston 16 stroke, is dx. A simple force balance across the cylinder 14 shows the output force of the cylinder 12:

$$F_{cylinder} = P_1 A_1 - P_2 A_2 \quad (2)$$

At the instant of initial contact (IC), the pressures $P_{1\_IC}$ and $P_{2\_IC}$ are set such that $F_{cylinder}$ matches the desired contact force. Additionally, the force control device 10 assumes the end of stroke position to seek contact with the workpiece. This position will have associated cylinder volumes $V_{1\_IC}$ and $V_{2\_IC}$ in the chambers formed in the cylinder 14 by the piston 16. During the initial contact phase, the cylinder piston 16 is displaced by a distance dx. Assuming compressed air is an ideal gas, and that the displacement occurs sufficiently quickly, the process can be approximated as adiabatic. The change in force output of the cylinder 14, from initial contact to steady state contact (SSC) is given by equation 3:

$$\Delta F_{cylinder} = P_{1\_IC}\left(\frac{V_{1\_IC}}{V_{1\_IC} + dxA_1}\right)^k A_1 - P_{2\_IC}\left(\frac{V_{2\_IC}}{V_{2\_IC} + dxA_2}\right)^k A_2 \quad (3)$$

where k is the ratio of specific heats, and for air k=1.4.

As equation 3 shows, the displacement of the piston 16 to compress chamber 1 will raise the pressure in chamber 1. In the same way, the displacement of the piston 16 that expands the volume in chamber 2 will lower the pressure in chamber 2.

Figure 7A:
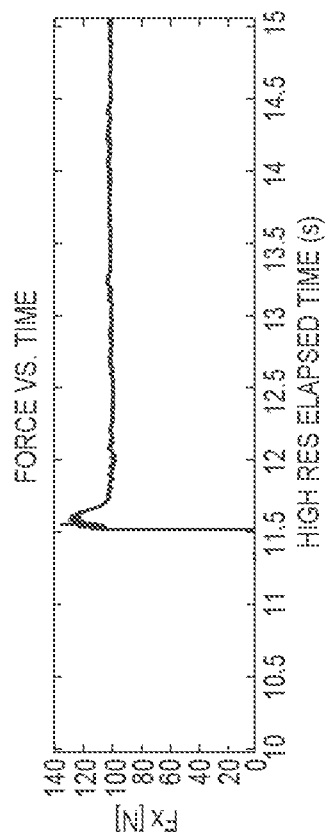
FIG. 7A is a graph of force vs. time for initial contact with a workpiece for a force control device with low force overshoot mitigation air flow.
Figure 7B:
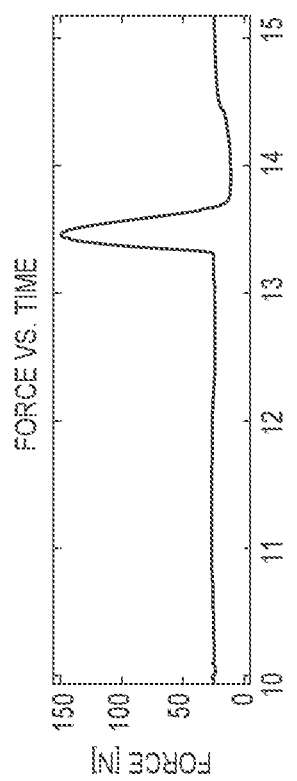
FIG. 7B is a graph of pressure in two chambers vs. time corresponding to the force depicted in FIG. 7A.
Figure 8A:
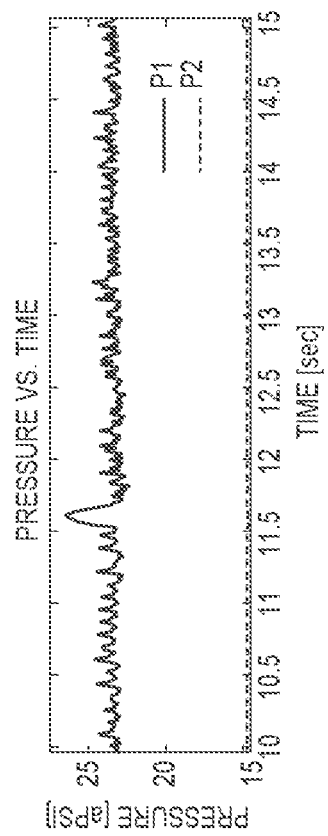
FIG. 8A is a graph of force vs. time for initial contact with a workpiece for a force control device with high force overshoot mitigation air flow.
Figure 8B:
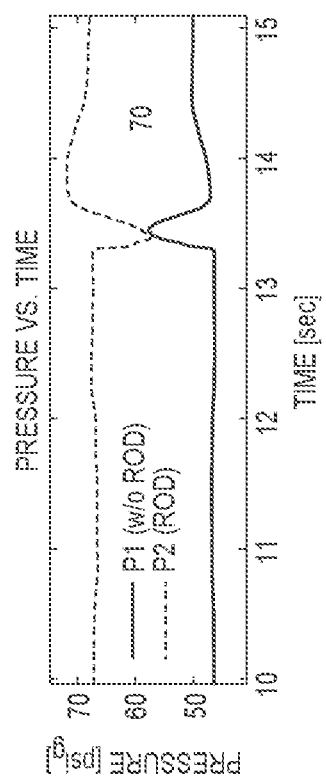
FIG. 8B is a graph of pressure in two chambers vs. time corresponding to the force depicted in FIG. 8A.

The change in force described in equation (3) depends on the assumption that the displacement of the piston 16 by dx occurs over a short time scale, dt. The duration of dt relates to how quickly air and can flow in out and out of the chambers of the cylinder 14. If the rate of mass air flow in and out of the chambers is slow, then the effect is present for larger values of dt (i.e., slower relative impact velocities). If the mass airflow rate is high, then the effect is strongest for smaller values of dt (i.e., larger relative impact velocities). The strength of the pressure change effect on the force overshoot is shown in FIGS. 7A-B and 8A-B, graphing force (FIGS. 7A, 8A) and pressure (FIGS. 7B, 8B) vs. time. FIG. 7 depicts a slower air flow rate, and shows how dramatic this effect can be. FIG. 8 depicts a faster air flow rate, and shows that the effect is reduced, but still present.

Though the above analysis focused on contact phase forces, other disturbance forces that cause a departure from the desired force usually act through the same mechanisms. Therefore, methods disclosed herein for reducing force overshoot are generally applicable to both contact phase forces and process disturbance forces.

One known way to avoid force overshoot upon contact between a robotic tool 22 and a workpiece 24 is to lower the force setpoint during the initial contact phase. This ensures the force overshoot of the contact will not exceed the desired force setpoint. Once contact has been detected, the force setpoint is increased until it reaches the force needed for processing the workpiece 24.

There are three important aspects to this approach. First, the initial "SearchPoint" and "Search Position" must be defined. These are the initial impact force setpoint and the carriage 20 position, respectively. Second, there must be a method for determining tool/workpiece contact and loss of contact events. Third, a defined response trajectory is required for reaching the desired process force, once a contact event has been detected.

Figures 9A, 9B:
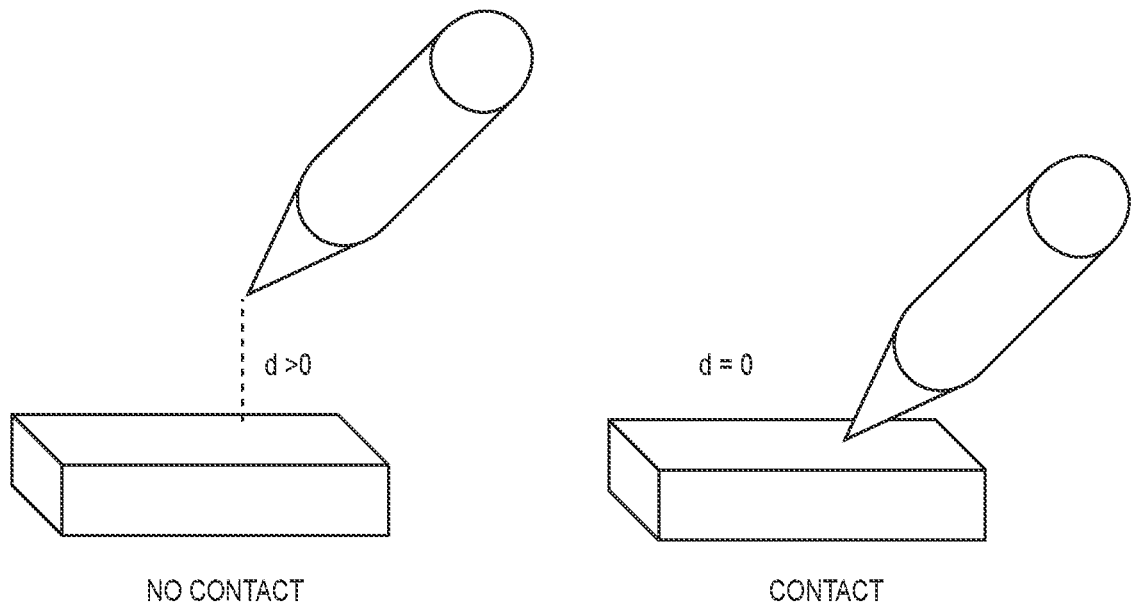
FIG. 9A depicts a robotic tool prior to contact with a workpiece.
FIG. 9B depicts the robotic tool having contacted the workpiece.

The motion primitives of a one degree-of-freedom (1-DOF) system allow contact between two rigid bodies to be analyzed by a simple distance function, as depicted in FIGS. 9A and 9B. In FIG. 9A, the distance d between the robotic tool 22 and the workpiece 24 is greater than zero. Contact is defined as the condition depicted in FIG. 9B, where d=0. If a first order model of the contact is defined, then stable contact is defined where $$d=0 \text{ and} \quad (4)$$

$$\dot{d}=0 \quad (5)$$

where $\dot{d}$ is the first derivative of distance with respect to time, or velocity.

Hence, the key to stable contact is having a velocity of zero, in addition to the distance function itself being zero. Unfortunately, while the distance function is defined relative to the two objects whose contact is the subject of interest, rarely in robotics applications is this distance function actually known. The available information is usually a reference position estimate of one or both of the objects. This leads to the velocity information containing no real significance to contact detection, as the relative motion between bodies is not known.

Figure 10:
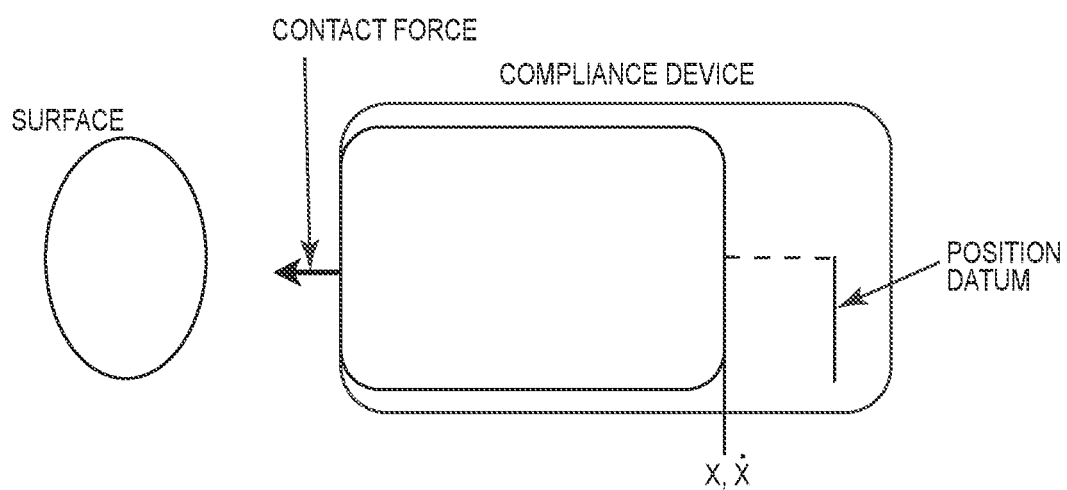
FIG. 10 depicts some parameters of a force control device.

Because a general solution is limited by the inability to obtain the distance function, more specific solutions are disclosed herein. This analysis begins with the state information for the object under direct control—in this case, a force control device 10 holding a robotic tool 22. FIG. 10 shows a typical compliance tool setup (without the tool), while highlighting the force, position, and velocity feedback terms. Because the absolute motion of each object is unknown, contact is detected by defining a state for one or more of the controlled system variables. Monitoring a deviation in the controlled parameter(s) allows a contact event to be accurately and reliably detected.

According to aspects of the present disclosure, a robotic force control device (FCD) 10 is configured to be interposed between a robot arm and a robotic tool 22. In one aspect, the robotic FCD 10 may be configured as depicted in FIG. 2. In this configuration, the robotic FCD 10 includes a carriage 20 that is capable of linear motion along an axis and is configured to be connected to a robotic tool 24. The robotic FCD 10 further includes a pneumatic cylinder 14, disposed in a housing 12. The cylinder 14 contains a piston 16 dividing the cylinder into first and second chambers. A rod 18 is connected to the piston 16, and protrudes from the cylinder 14. The rod 18 is connected to the carriage 20 outside of the cylinder 14. The robotic FCD 10 further includes a pneumatic control system 26 connected in air flow relation with each of the first and second cylinder chambers via respective first and second air lines. As known in the art, prior to (and following) contact between the robotic tool 22 and a workpiece 24, the position of the piston 16 within the cylinder 14—and hence the position of the carriage 20 along its extent of motion, or stroke—is controlled by adjusting pneumatic pressures in the first and second cylinder chambers. After contact with a workpiece 24, the force setpoint—that is, the applied force with which the robotic tool 22 presses against the workpiece 24—is also controlled via pneumatic pressures. A force measuring device (not shown in FIG. 2) monitors this force. The FCD 10 of FIG. 2 is a representative example only. As those of skill in the art are aware, a FCD 10 may be constructed and configured in various ways. In general, the FCD 10 will control the position and/or force of a robotic tool along a compliance stroke, or distance that the FCD 10 can move the robotic tool independently of movement of a robotic arm.

Figure 11:
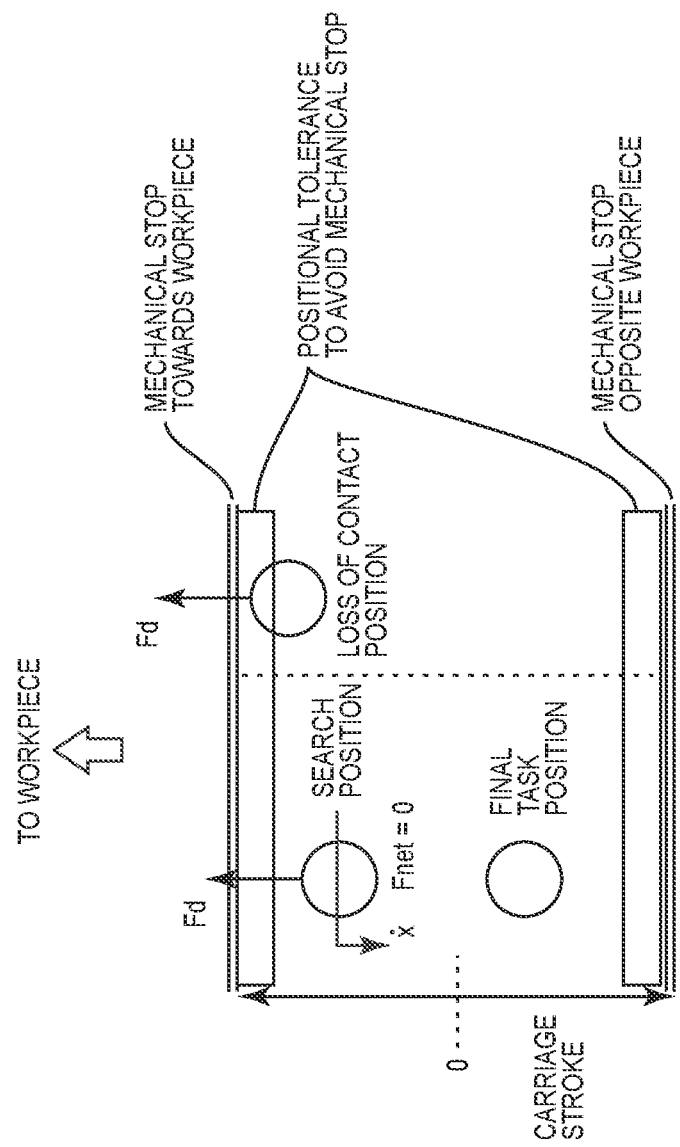
FIG. 11 is a diagram depicting positions of a reference point in a force control device in a steady state search method of contact detection.

According to a first aspect of the present disclosure, a steady state search method is employed to detect contact between a robotic tool 22 and a workpiece 24. The force control device 10 is configured as depicted in FIG. 11. The FCD 10 moves the robotic tool 22 between mechanical stops at either end of its compliance motion range, or stroke. To avoid positioning the robotic tool 22 at either extreme of the FCD 10 stroke, positional tolerances, or exclusion zones, are programmed into the FCD 10 motion control software. For example, for a FCD 10 that can control its position to within 0.3 mm of accuracy, the positional tolerances may prevent the robotic tool 22 from being positioned within 0.5 mm of a mechanical stop at either end of its stroke. An initial search position, preferably forward (towards the workpiece 24) of the half-way point of the FCD 10 stroke, is selected. In some aspects, the search position may be user-defined. As well known in the art, pressures are adjusted in chambers fore and aft of the piston 16 to position the robotic tool 22 at the selected search position, and then equalized so the net force $F_{net}=0$.

The robot arm is then slowly moved toward the workpiece 24 (or vice versa). In one aspect, contact between the robotic tool 22 and the workpiece 24 is detected by detecting a change in the position of the robotic tool 22 along the FCD 10 compliance motion stroke, opposite to the desired force vector. In another aspect, contact between the robotic tool 22 and the workpiece 24 is detected by sensing a contact force in excess of a predetermined threshold. In response to detecting contact, motion of the robot arm is controlled to position the carriage at the final task position, as depicted in FIG. 11. Loss of contact as the robot arm moves away from the workpiece 24 is detected by the position of the robotic tool 22 being within the forward positional tolerance of the FCD 10 (i.e., within threshold of, or touching, the forward mechanical stop).

Figure 12A:
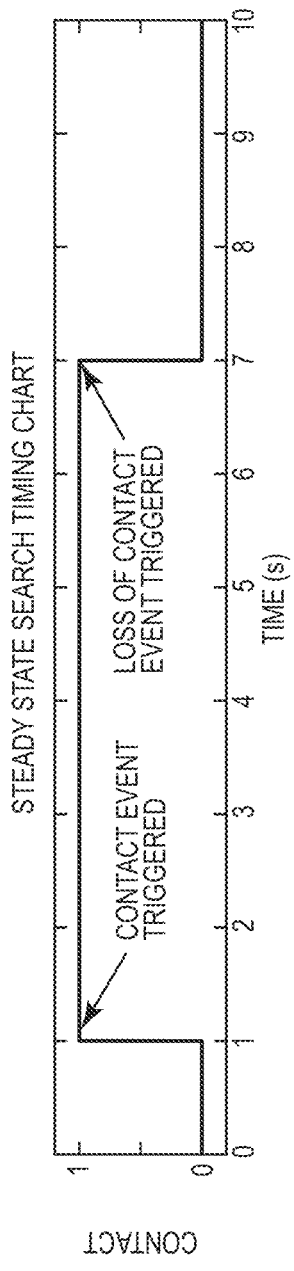
FIG. 12A is a time diagram showing contact of a robot tool with a workpiece in the steady state search method of contact detection.
Figure 12B:
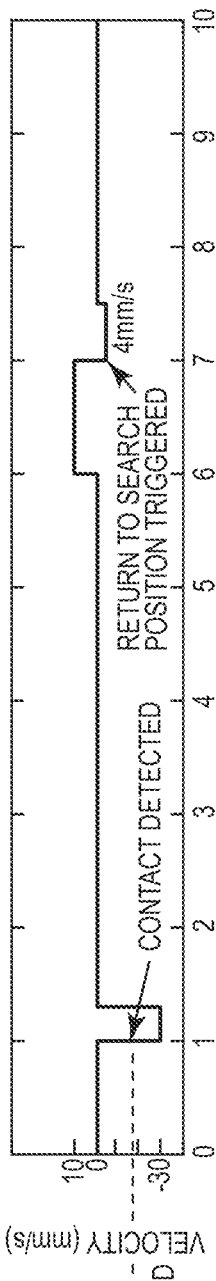
FIG. 12B is a time diagram showing the velocity of a robot tool before, during, and after contact with the workpiece in the steady state search method of contact detection.
Figure 12C:
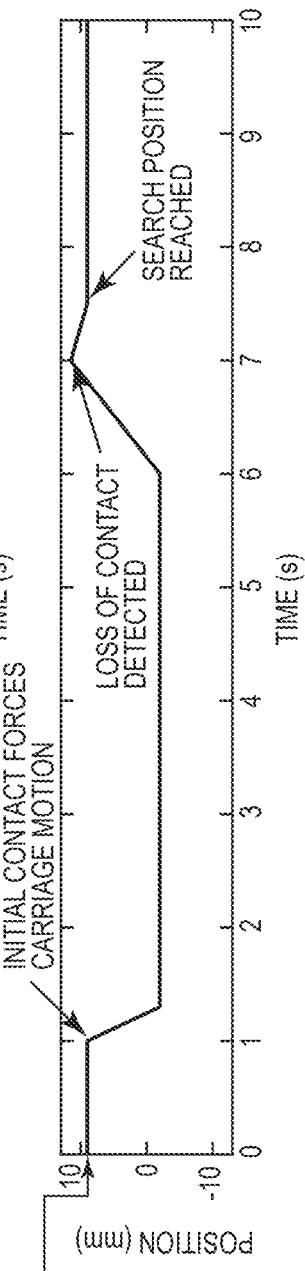
FIG. 12C is a time diagram showing changes in a reference position of a force control device before, during, and after contact of the robotic tool with the workpiece in the steady state search method of contact detection.

FIG. 12A plots the actual contact, and FIGS. 12B-C plot the robotic tool 22 velocity, position, and force, respectively, for the steady state search method. Initially, as the robotic tool 22 transitions from not contacting the workpiece 24 to contact (FIG. 12A), it moves in a direction opposite the desired force (FIGS. 12B, 12C). This change in position of the robotic tool 22, or alternatively, an increased force detected (FIG. 12D) signals contact with the workpiece 24, which may trigger a stop in the forward motion of the robot arm. The force applied by the robotic tool 22 to the workpiece 24 is then ramped up to the desired force setpoint (FIG. 12D), as described in greater detail herein. Processing of the workpiece 24 proceeds, with the FCD 10 moving along its compliance stroke, and/or adjusting the force behind the piston 16, to maintain the applied force at the force setpoint. As one example, the applied force may be adjusted to account for changes in a component of the tool weight vector, as the robotic tool 22 changes its orientation in the inertial reference frame.

Figure 12D:
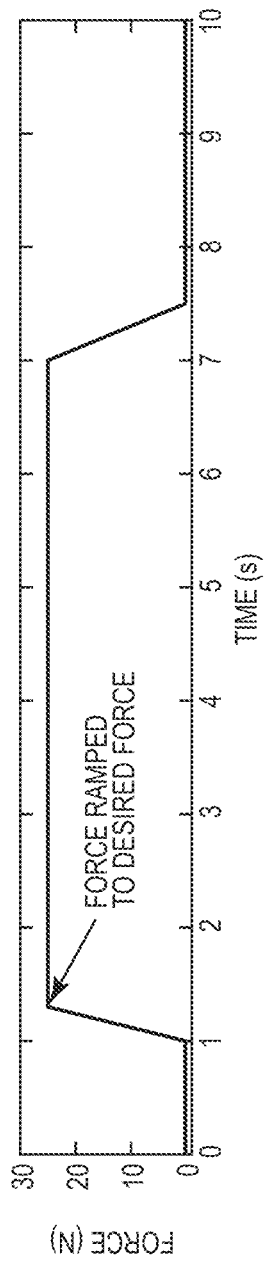
FIG. 12D is a time diagram showing force applied by a robot tool on a workpiece before, during, and after contact in the steady state search method of contact detection.

When the programmed processing of the workpiece 24 is complete, the robot controller moves the robot arm away from the workpiece 24. The FCD 10 moves the robotic tool 22 in compliance motion (FIG. 12B), to maintain contact with, with the desired application force on, the workpiece 24 (FIG. 12D). As contact is lost (FIG. 12A), the robotic tool 22 will hit the mechanical stop (or the programmed positional tolerance) (FIG. 12C), which is registered as a loss of contact event (FIG. 12A). The robotic tool 22 then returns to the search position (FIGS. 12B, 12C).

Figure 13:
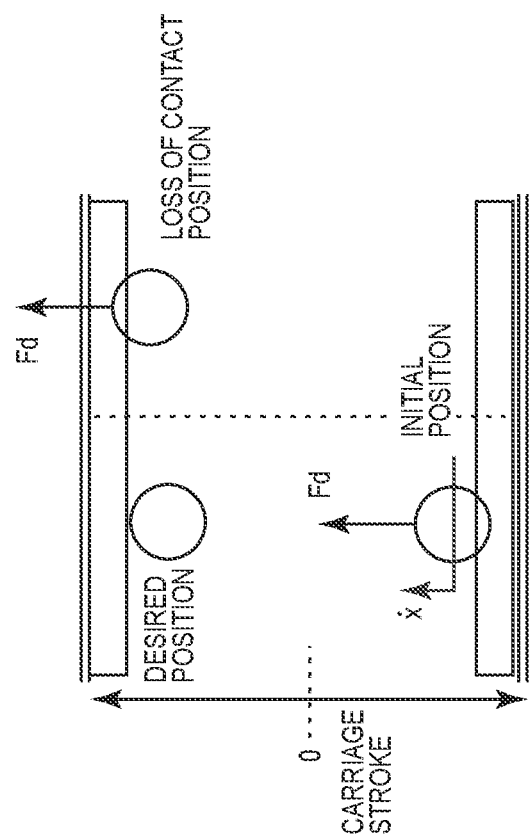
FIG. 13 is a diagram depicting positions of a reference point in a force control device in a transient search method of contact detection.

According to a second aspect of the present disclosure, a transient search method is employed to detect contact between a robotic tool 22 and a workpiece 24. The FCD 10 is configured as depicted in FIG. 13. The robotic tool 22 is moved to an initial position at or near the far extent of the FCD 10 compliance motion stroke (furthest from the workpiece 24). As shown, the software may be programmed to disregard the positional tolerance for this initial position. In the transient search method, the robot arm may be positioned an estimated distance from the workpiece 24 that is less than the FCD 10 compliance motion stroke.

The FCD 10 then slowly advances the robotic tool 22 towards the workpiece 24, while monitoring the force applied by the robotic tool 22. Contact between the robotic tool 22 and the workpiece 24 is detected by sensing a contact force $F_d$ in excess of a predetermined threshold. In response to detecting contact, motion of the FCD 10 is stopped (or alternatively, controlled to position the FCD 10 at the desired position, as depicted in FIG. 13). Loss of contact as the robot arm moves away from the workpiece 24 is detected as in the case of the steady state search method described above—that is, by the position of the robotic tool 22 being within the positional tolerance of the FCD 10 (i.e., within threshold of, or touching, the mechanical stop).

Figure 14:
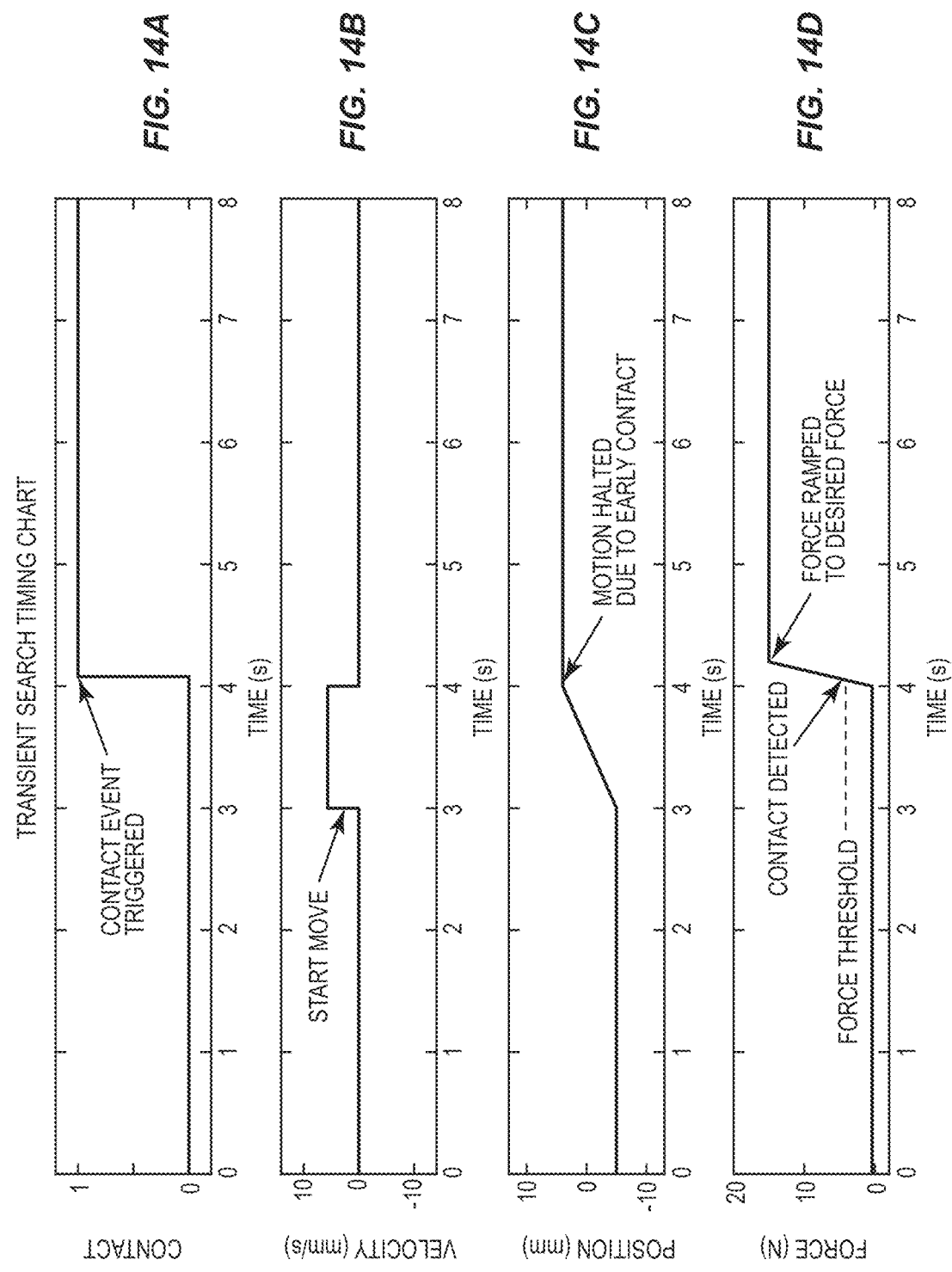
FIG. 14A is a time diagram showing contact of a robot tool with a workpiece in the transient search method of contact detection.
FIG. 14B is a time diagram showing the velocity of a robot tool before, during, and after contact with the workpiece in the transient search method of contact detection.
FIG. 14C is a time diagram showing changes in a reference position of a force control device before, during, and after contact of the robotic tool with the workpiece in the transient search method of contact detection.
FIG. 14D is a time diagram showing force applied by a robot tool on a workpiece before, during, and after contact in the transient search search method of contact detection.

FIG. 14A plots the actual contact, and FIGS. 14B-C plot the robotic tool 22 velocity, position, and force, respectively, for the transient search method. Initially, the robotic tool 22 moves towards the workpiece (FIGS. 14B, 14C). At, and after, the point of contact (FIG. 14A), the measured force with which the robotic tool 22 is pressed against the workpiece 22 increases (FIG. 14D). Increase of this force past a threshold signals contact (FIG. 14d). Detection of contact halts forward motion of the robotic tool 22 (FIGS. 14B, 14C). The force applied by the robotic tool 22 to the workpiece 24 is then ramped up to the desired application force (FIG. 12D), as described in greater detail herein. Processing of the workpiece 24 proceeds, with the FCD 10 adjusting the force behind the piston 16 to maintain the applied force at the force setpoint. Following processing, as the robot arm moves the robotic tool 22 away from the workpiece 22 (or vice versa), detection of loss of contact is as described above with respect to the steady state search method.

Once contact between the robotic tool 22 and a workpiece 24 is detected—whether through the steady state or transient search methods described above—the FCD 10 transitions its control mode from position control to force control. To prevent force spikes which may damage the workpiece 24, this transfer is ideally bumpless. Bumpless transfer is known in the art as a procedure used in transferring a Proportional-Integral-Derivative (PID) controller between control modes—conventionally, between manual and automatic control modes. The desired result of bumpless transfer is to prevent transient changes in the controller output when switching modes. As known in the art, a PID controller continuously calculates an error value as the difference between a desired setpoint and a measured process variable (PV). Proportional, integral, and derivative control loops then each generate contributions to a control variable, which alters some process or property to achieve a change in the process variable, in the direction of the setpoint. Bumpless transfer ensures that changes in the control variable are gradual, causing only a smooth change in the process variable as a result of the control mode change.

Figure 1:
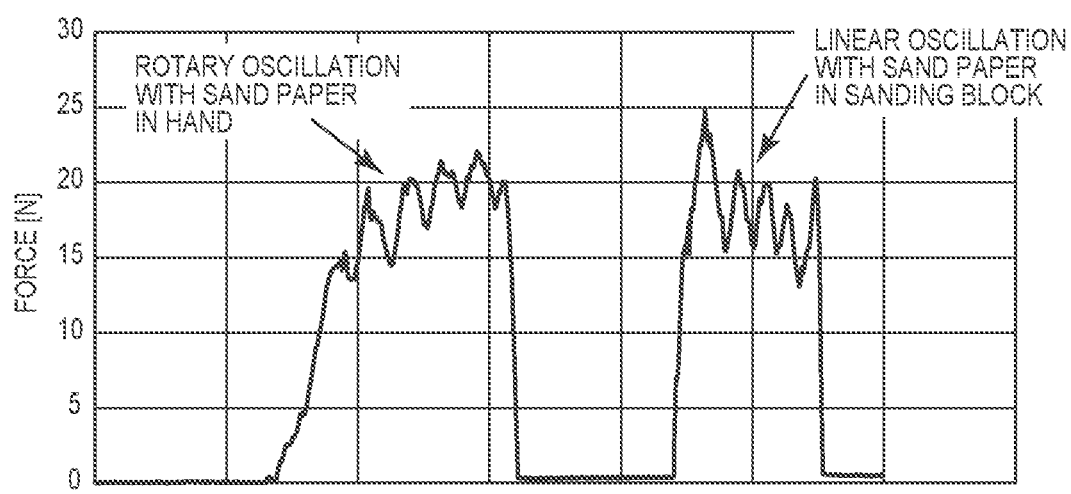
FIG. 1 is a graph of force applied by a human operator in material removal operations on a workpiece.

According to aspects of the present disclosure, bumpless control transfer is applied to change the FCD 10 from position control mode to force control mode. Prior to contact with a workpiece 24, the FCD 10 operates in position control mode. Inputs to the PID controller are position, velocity, and force, and the outputs drive pneumatic pressure in fore and aft chambers of a pneumatic cylinder 14 to control the position of the piston 16 (and hence the carriage 20 connected to the robotic tool 22, in the example of FIG. 1). After contact between the robotic tool 22 and workpiece 24 is detected, the FCD 10 switches to a force control mode. The inputs to the controller are still position, velocity, and force, but the outputs drive pneumatic pressures in the cylinder 14 to control the force applied by the robotic tool 22 to the workpiece 24. By employing a bumpless transfer technique when switching between the position and force control modes, changes in the pressures of the chambers in the pneumatic cylinder 14 are smooth, and do not generate large transients in the force applied to the workpiece 24. In particular, in contrast to the graph of FIG. 4, the contact force does not exceed the force setpoint, which is the desired steady-state force applied between the robotic tool and the workpiece.

Figure 15:
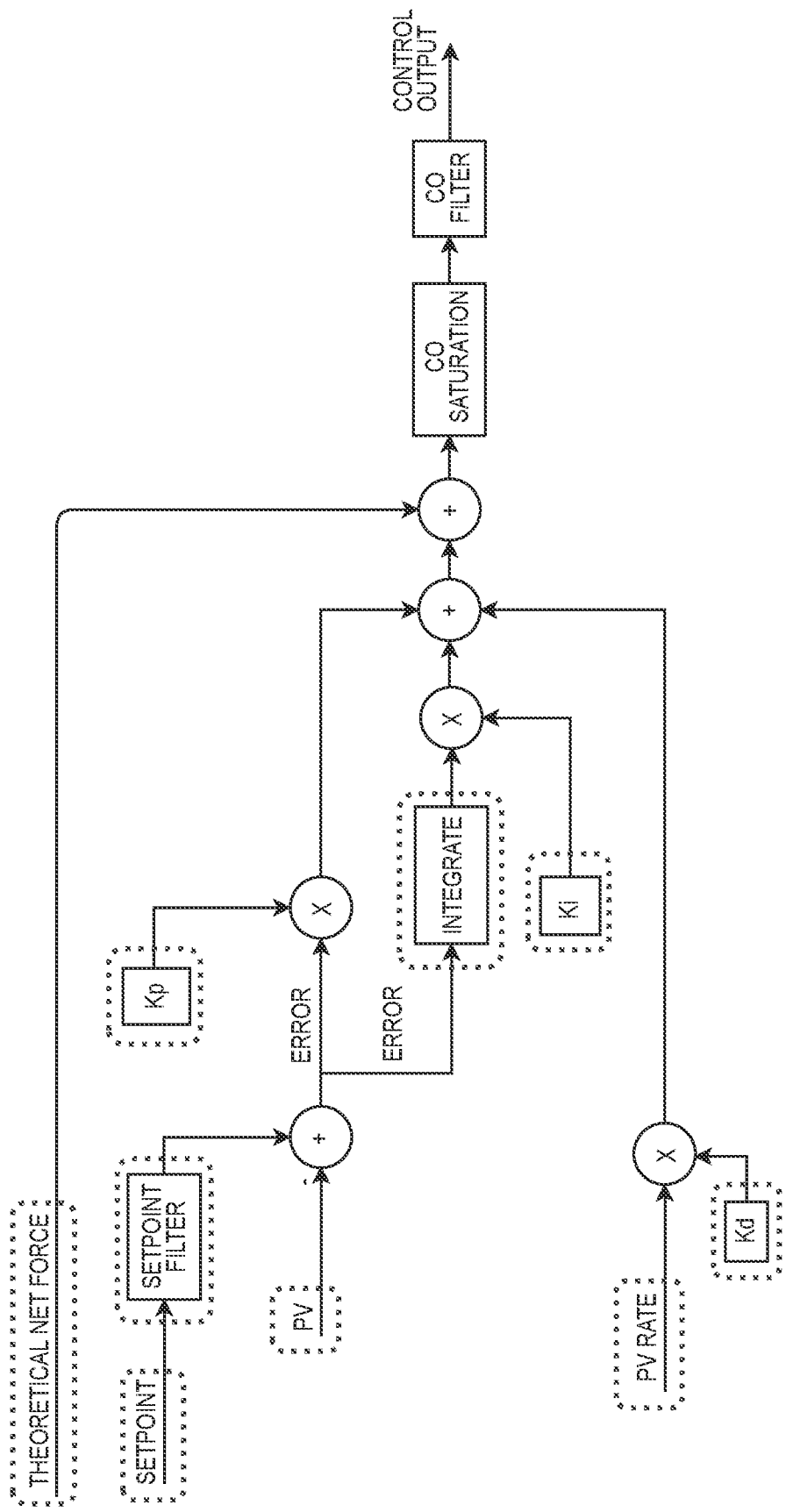
FIG. 15 is a control system diagram of a force control device.

FIG. 15 depicts a basic block diagram of the high-level FCD 10 PID controller. The blocks surrounded by dotted-line boxes are the variables or functions that have a change of physical units/quantities in the control mode transition. Instantaneous changes in these parameters would directly drive an instantaneous change of the output. To prevent the output from instantaneously changing when control modes are switched, the transition method of each of these identified variables/functions is controlled.

Table 1 below indicates the controller terms that will instantaneously change from one iteration of the controller in a first mode (i.e., position control), to the next iteration of the controller in a different mode (i.e., force control). No transfer mechanism is needed for these terms. In Table 1, k=1 defines the first iteration of the given control mode.

TABLE 1

Change in Controller Terms for Control Mode Transition

| Control Term | Position Control Value @k = 1 | Force Control Value @k = 1 |
|---|---|---|
| Theoretical Net Force | g*Total Mass | g*Total Mass + Force Setpoint |
| Setpoint | user-spec Position setpoint | user-spec Force setpoint |
| PV | Position feedback (x) | Force feedback (f) |
| PV rate | Speed feedback (dx/dt) | Force rate feedback (df/dt) |
| Kp | Pos Kp Gain | Force Kp Gain |
| Ki | Pos Ki Gain | Force Ki Gain |
| Kd | Pos Kd Gain | Force Kd Gain |

For bumpless transfer of control modes, the respective units and relative magnitudes listed in Table 1 must transition between their position mode and force mode values in a manner that does not cause a jump in the control output. The setpoint filter must be reset; however, if a simple reset to zero were performed, then the filter would have a more dramatic change than desired for certain states (i.e., position and force combinations). Accordingly, the control mode transition is more detailed.

In particular, both the setpoint and the process variable (PV) change from distance units to force units. The integral term of the PID controller must be reset for these unit scaling differences. Resetting the integral term causes a discontinuous change in the output value, and thus a simple reset alone cannot be performed and still achieve a bumpless mode transfer. Accordingly, the integral term reset decays over a plurality of iterations.

The setpoint filter is a lowpass filter that smooths setpoint commands. With a high frequency or large amplitude change, the PID controller is more susceptible to instability. The setpoint filter thus limits setpoint changes for any one iteration of the controller to a level that ensures controller stability. When changing modes of the PID controller, the setpoint filter value is matured—meaning the filter coefficients are updated only slightly, to values that allow the filter to pass the current value through as if it were already in the steady state. In one aspect, a linear low-pass filter is used, so the filter coefficients can easily be computed and initialized to values that reflect a steady state filter value.

To transition the PID controller from position control mode to force control mode, the control gains Kp, Ki, and Kd are changed from position gains to force gains. The setpoint is changed to the force setpoint value, which has different physical units. The internal state of the setpoint filter is reset, and the filter is iteratively advanced to the start value of the new setpoint.

Another point to address in transitioning the PID controller from distance to force control modes is the integral term. An instantaneous change in the integral term from the position mode value to a force mode value may cause a step change in the pressure of the pneumatic cylinder 14, and a potentially harmful discontinuity in operation of the FCD 10. Accordingly, upon a PID controller mode change, the current value of the integral term is copied to a memory location assigned to a previous integral term value, where it is used for several iterations of the PID controller. The current value of the integral term is decayed over several iterations to zero, in one aspect, as a simple exponential decay:

$$\frac{1}{(1-\text{scale factor})^i} * \text{previous integral term} \tag{6}$$

where the discrete control iteration i starts at 1 (if started from 0, (i+1) is used in equation (6) instead of i, to avoid divide by zero issues).

The transfer of the integral term is active for i<X, where X is a time constant (expressed as a number of control iterations) sufficient to complete the bumpless mode transition. The previous integral term is the integral term of (integral (error)*$K_i$) from the beginning of the mode transition.

For i<X, the PID controller integral term is $$\text{Integral Term} = \frac{1}{(\text{scale factor}*i)^i} * \text{previous integral term} + \text{current integral term} * K_i \tag{7}$$

And for i≥X, the PID controller integral term is $$\text{Integral Term} = \text{current integral term} * K_i \tag{8}$$

Figure 16:
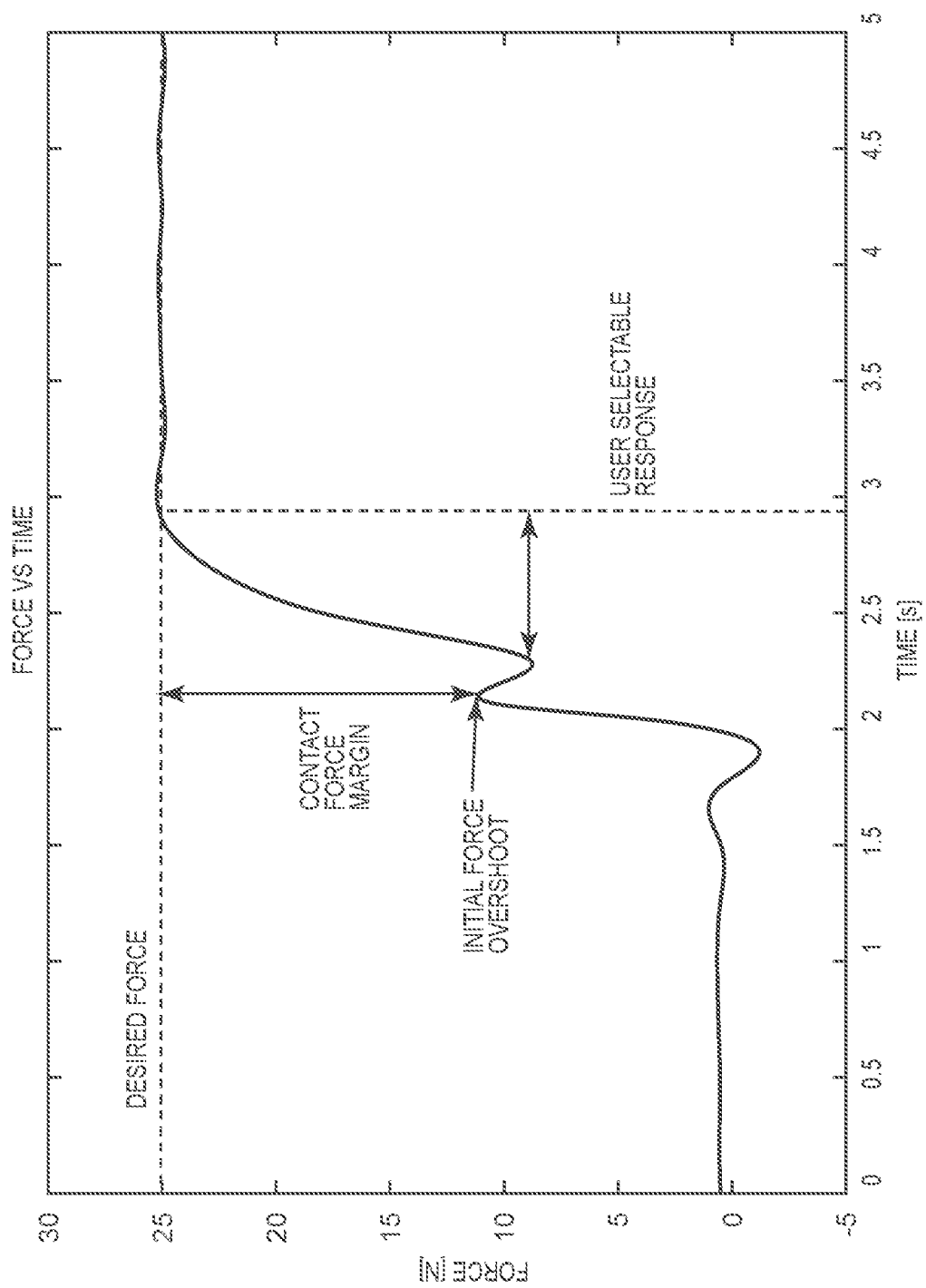
FIG. 16 is a graph of force applied by a robotic tool to a workpiece upon and following contact.

FIG. 16 is a graph of the force between the robotic tool 22 and a workpiece 24, according to aspects of the present disclosure. Initially, the robotic tool 22 is maintained in a position along the FCD 10 compliance motion stroke, away from a mechanical stop, and generates a net force of zero. The force increases upon contact of the robotic tool 22 and the workpiece 24. However, the initial contact force is well below the force setpoint. By employing a bumpless transfer of the PID controller from position control mode to force control mode, and gradually ramping the applied force to the force setpoint, the applied force increases smoothly, without severe transients. Importantly, the initial contact force never exceeds the force setpoint.

Figure 17:
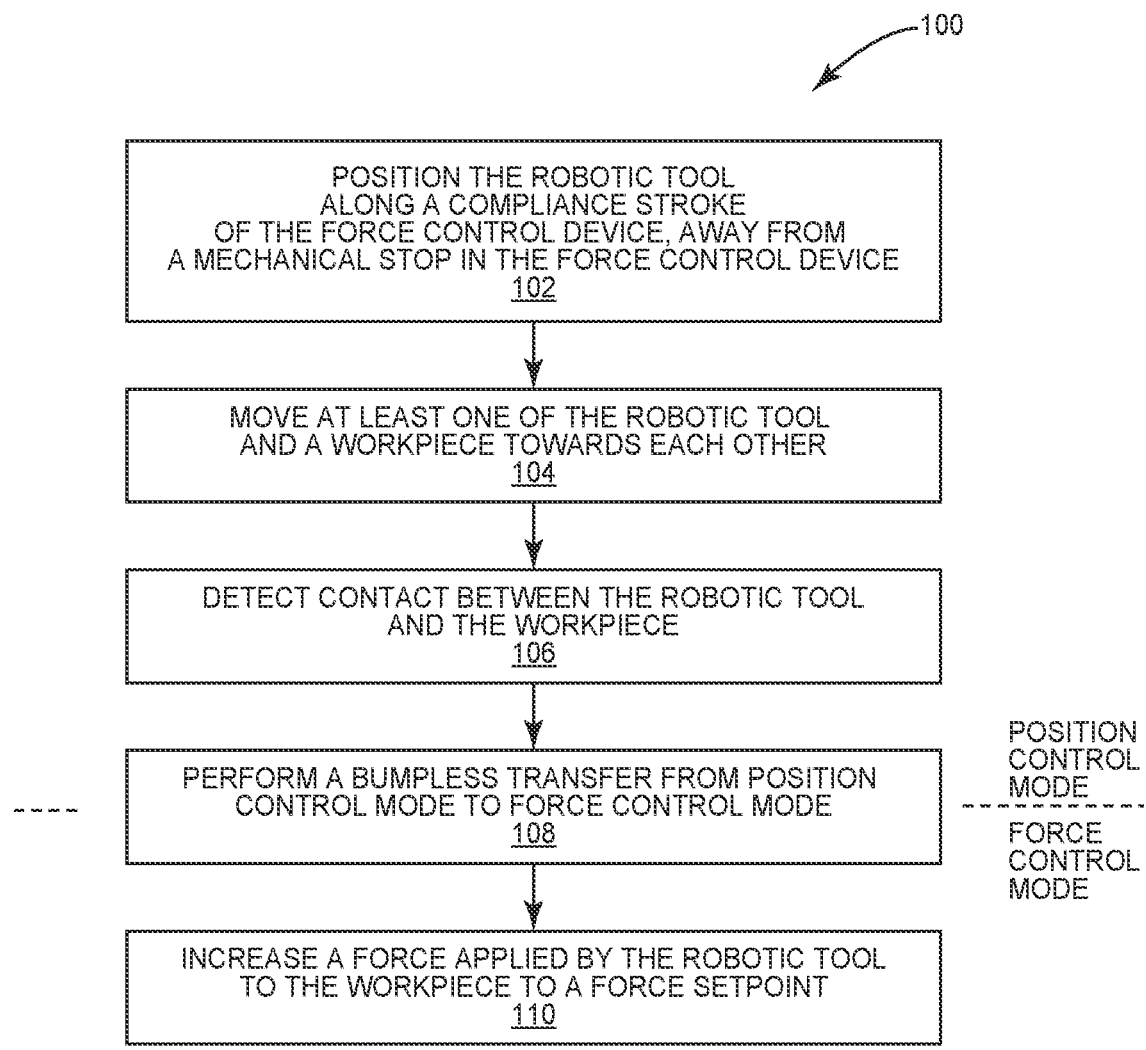
FIG. 17 is a flow diagram of steps in a method of controlling a robotic force control device.

FIG. 17 depicts the steps in a method 100 of controlling a robotic force control device 10 comprising a robotic tool 22. The robotic force control device 10 includes a carriage 20 capable of motion along a compliance stroke, delimited at at least one end by a mechanical stop. In a position control mode, the robotic tool 22 is positioned along a compliance stroke of the force control device 10, away from a mechanical stop in the force control device 10 (block 102). At least one of the robotic tool 22 and a workpiece 24 are moved towards each other (block 104). Contact between the robotic tool 22 and the workpiece is detected (block 106). A bumpless transfer from position control mode to force control mode is performed (block 108). In force control mode, a force applied by the robotic tool 22 to the workpiece is increased to a force setpoint (block 110)

In one aspect, the force applied to a workpiece is ramped to the user's final desired force value via a linear ramp rate. This linear ramp rate is implemented as a discrete ramp rate filter on the force controller setpoint. The filter implementation in the time domain is the simple update equations:

$$\Delta SP_k = SP_{desired} - SP_{k-1} \tag{9}$$

$$SP_k = SP_{k-1} + \text{sign}(\Delta SP_k)\min(\text{setpointRateTol}, \Delta SP_k) \tag{10}$$
where $SP_{desired}$ is the desired setpoint input,
$SP_{k-1}$ is the setpoint from the prior iteration (or initialized to the current value of the feedback for that controlled term when starting the controller),
$\Delta SP_k$ is the the filtered setpoint value to propagate further into the respective controller, and
SetpointRateTol defines the maximum force setpoint change per controller iteration; thus it factors in the controller frequency.

A value of force unit per iteration comes from defining a ramp rate in force units per second and a known controller frequency. This is used in the force-controller, setpoint filter. In other aspects, the ramping from initial force to desired force may be along a user-defined trajectory, by replacing equation (10) with a desired transfer function.

A pneumatic cylinder piston is often modeled as a mass between two springs, due to the spring-like nature of compressed air. The lower the pressures on either side of the piston, the lower is the mechanical stiffness of the system. Typically, a FCD is comprised of low friction components, such that the system stiffness is very low at low pressures. For an FCD operating in force control mode this is ideal. However, when the FCD is operated in position control mode, this can lead to oscillatory behavior. In particular, the horizontal orientation (with respect to gravity) represents a very low stiffness system, as the pressures in the cylinder are very low when in position control mode. This can lead to an inability of the system to perform position control in a stable and repeatable manner. For the effectiveness of holding the searchPosition described above, the position controller must be of adequate stiffness to maintain the desired position, without unwanted oscillatory behavior.

To increase the stiffness of the pneumatic system, the device increases the backpressure of the cylinder. There are many known methods of increasing the backpressure of a device, but to be effective in the FCD, it is required to also be able to switch back to a minimally stiff system, through removal of the backpressure. Thus, the FCD should have a means of effectively altering its system stiffness dynamically.

Two aspects that do so are described herein. These are presented to thoroughly explain the concept to one of skill in the art, and are not meant to be the exclusive means by which to perform such a function.

Figure 18:
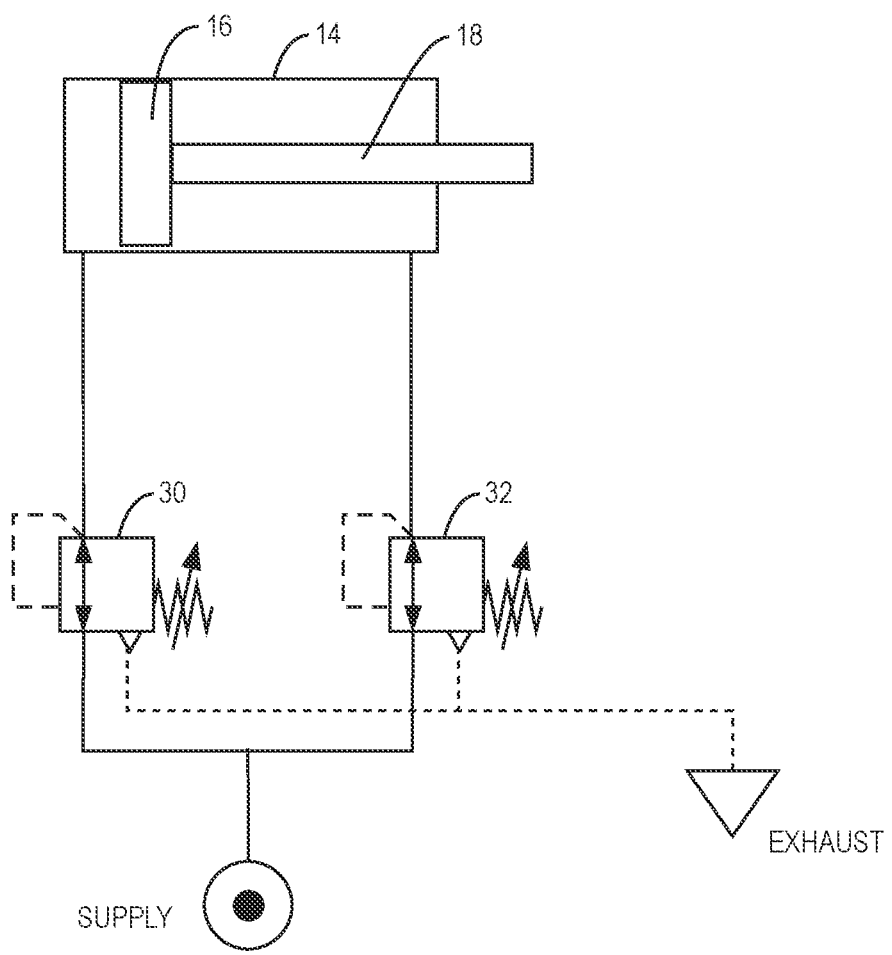
FIG. 18 is a pneumatic schematic diagram of a first aspect of system stiffness control.

FIG. 18 depicts one such aspect, in which the cylinder 14 chambers are pressurized through independent pressure control devices 30, 32. One pressure control device 30 regulates the back pressure—which is set to atmospheric pressure in force control mode, but increased to a higher pressure value in position control mode. Another pressure control device 32 regulates pressure in the other chamber, in response to the desired system stiffness, and to control the pressure applied to the workpiece.

Figure 19:
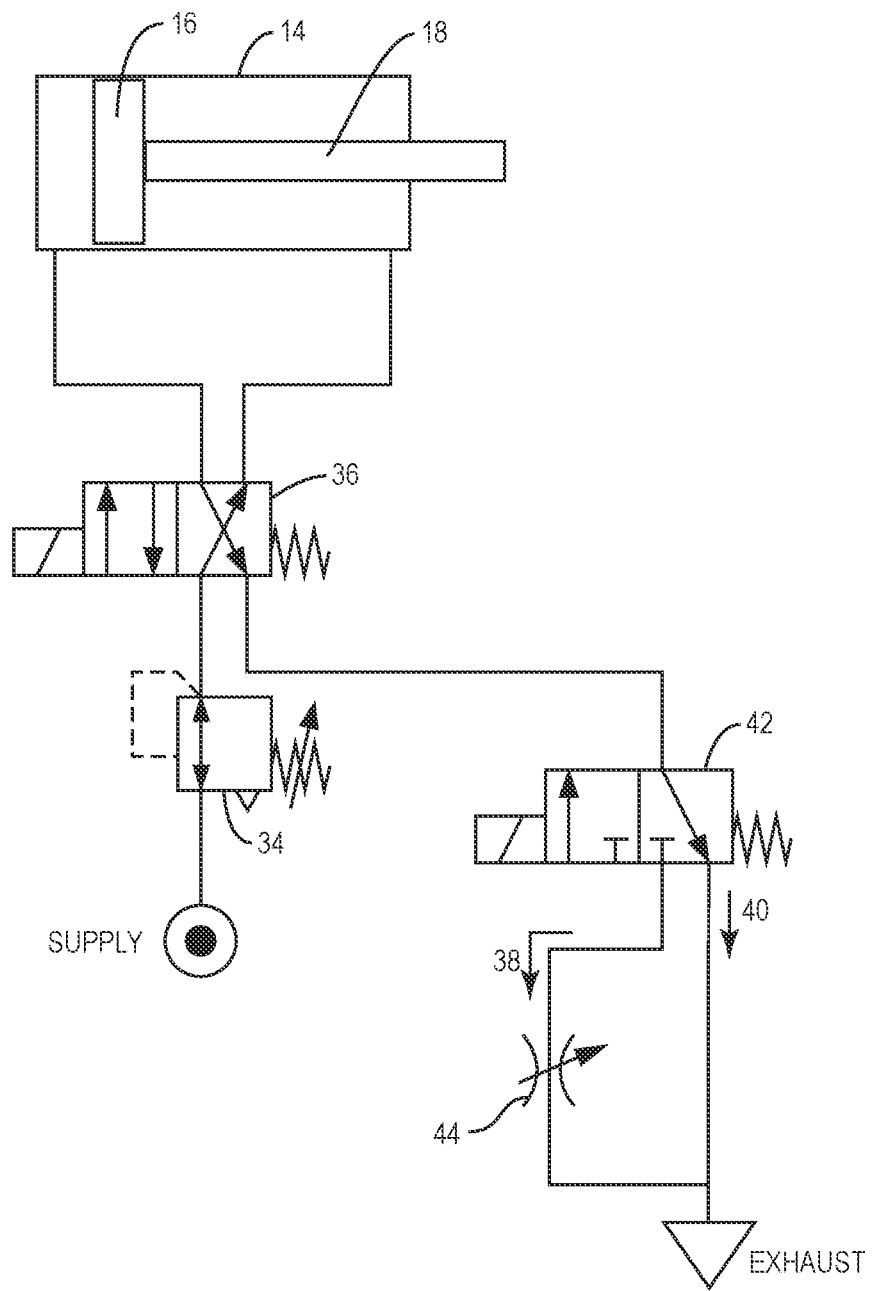
FIG. 19 is a pneumatic schematic diagram of a second aspect of system stiffness control.

FIG. 19 depicts another aspect, in which a single pressure control device 34 routes pneumatic fluid, through a directional control valve 36, to either of the cylinder chambers. The cylinder chamber not connected to the pressure control device 34 is routed to the exhaust. The exhaust flow path is set up to have a high impedance route 36 and a low impedance route 40. A three port and two state directional control valve 42 is used to switch between the two flow paths 38, 40. The low impedance path 40 is plumbed directly to the exhaust, and offers very little resistance to the exhaust flow. Such a flow path 40 maintains a minimal backpressure in the device, and is thus the flow path used during force control mode. The high impedance flow path 38 consists of a flow restriction device 44 that limits the exhaust rate, thus increasing the backpressure of the device and allowing the FCD 10 to remain more stable in position control mode.

When contact with the workpiece is detected, and the transfer from position control mode to force control mode is triggered, the stiffness of the system is immediately altered to enter the minimal stiffness state. Upon loss of contact, the FCD 10 returns to position control mode, which triggers the higher stiffness configuration. As used herein, an FCD 10 in a stiff configuration is one in which the cylinder backpressure is sufficient to prevent oscillation in position control mode. As used herein, a FCD 10 in a minimally stiff configuration is one in which the cylinder backpressure is low, allowing for fine force control in force control mode, but which may allow oscillation in position control mode. In various aspects of the present disclosure, the FCD 10 may assume a stiff configuration in position control mode, and transition to a minimally stiff configuration in force control mode.

Aspects of the present disclosure present numerous advantages over the prior art. By adding one or more force overshoot mitigation air passages—either connecting the chambers through the piston 16, or discharging air from a chamber through the cylinder 14 or air line(s)—the force overshoot upon initial contact of a material removal tool 22 with a workpiece 24 is dramatically reduced. This may yield more consistent workpiece finishing results, avoiding deleterious effects which may result from excessive contact force.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the aspects disclosed herein may be applied to any other aspect, wherever appropriate. Likewise, any advantage of any of the aspects may apply to any other aspects, and vice versa. Other objectives, features and advantages of the enclosed aspects will be apparent from the description. As used herein, the term "configured to" means set up, organized, adapted, or arranged to operate in a particular way; the term is synonymous with "designed to."

The present disclosure may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. A method of controlling a robotic force control device comprising a robotic tool, comprising:
   in a position control mode, positioning the robotic tool along a compliance stroke of the force control device, away from a mechanical stop in the force control device;
   reducing a distance between the robotic tool and a workpiece;
   detecting contact between the robotic tool and the workpiece;
   performing a bumpless transfer from the position control mode to a force control mode in response to detecting contact between the robotic tool and the workpiece; and
   in the force control mode, increasing a force applied by the robotic tool to the workpiece to a force setpoint;
   whereby the force applied by the robotic tool to the workpiece at contact is less than the force setpoint.

2. The method of claim 1 wherein reducing the distance between the robotic tool and the workpiece comprises process to part motion.

3. The method of claim 1 wherein reducing the distance between the robotic tool and a workpiece comprises part to process motion.

4. The method of claim 3 wherein the initial search position is within a half of the compliance motion stroke of the force control device towards the workpiece.

5. The method of claim 1 wherein detecting the contact between the robotic tool and the workpiece comprises a steady state search, comprising:
   positioning the robotic tool at an initial search position along a compliance motion stroke of the force control device; and
   moving the robotic tool and the workpiece towards each other;
   wherein detecting the contact between the robotic tool and the workpiece comprises detecting a change in position of the robotic tool along the compliance motion stroke of the force control device.

6. The method of claim 1 wherein detecting the contact between the robotic tool and the workpiece comprises a steady state search, comprising:
   positioning the robotic tool at an initial search position along a compliance motion stroke of the force control device; and
   moving the robotic tool and the workpiece towards each other;
   wherein detecting the contact between the robotic tool and the workpiece comprises detecting a force with which the robotic tool contacts the workpiece in excess of a predetermined threshold.

7. The method of claim 1 wherein detecting the contact between the robotic tool and the workpiece comprises a transient search, comprising:
   positioning the robotic tool at an initial position along the compliance stroke of the force control device; and
   moving the robotic tool along the compliance stroke of the force control device towards the workpiece;
   wherein detecting the contact between the robotic tool and the workpiece comprises detecting a force with which the robotic tool contacts the workpiece in excess of a predetermined threshold.

8. The method of claim 7 wherein the initial position is past a half-way point of the compliance stroke of the force control device in a direction opposite the workpiece.

9. The method of claim 1 further comprising detecting loss of contract between the robotic tool and the workpiece by detecting a position of the robotic tool at along the compliance stroke of the force control device that is a predetermined distance from a mechanical stop closest to the workpiece.

10. The method of claim 1 wherein the force control device includes a Proportional-Integral-Derivative (PID) controller, and wherein performing the bumpless transfer from the position control mode to a force control mode comprises:
changing a position setpoint value to a force setpoint value having different physical units;
resetting an internal state of a lowpass setpoint filter; and
iteratively updating setpoint filter coefficients such that the setpoint filter output reaches the force setpoint value over a plurality of control iterations.

11. The method of claim 10, wherein performing the bumpless transfer from the position control mode to the force control mode further comprises:
changing an integral gain factor from a position integral gain factor to a force integral gain factor;
for a transition duration comprising a plurality of control iterations after switching from the position control mode to the force control mode, ramping a value of an integral term of the PID controller from a value calculated using the position integral gain factor to a value calculated using the force integral gain factor.

12. The method of claim 11, wherein ramping a value of an integral term of the PID controller from a value calculated using the position integral gain factor to a value calculated using the force integral gain factor comprises:
upon switching from the position control mode to the force control mode,
copying a current integral term to a memory location allocated for a previous integral term; and
resetting the current integral term;
during the transition duration, at each control iteration,
decaying the value of the previous integral term; and
setting an integral term of the PID controller to the decayed previous integral term plus the current integral term times the force integral gain factor; and
after the transition duration, at each control iteration,
setting the integral term to the current integral term times the force integral gain factor.

13. The method of claim 12, wherein decaying the value of the previous integral term comprises exponentially decaying the value of the previous integral term.

14. The method of claim 13, wherein during the transition duration,

Integral Term =
$$\frac{1}{(\text{scale factor}*i)^i} * \text{previous integral term} + \text{current integral term} * K_i;$$

and
after the transition duration,
Integral Term=current integral term $*K_i$,
where $K_i$ is the force integral gain factor;
i is the discrete control iteration, starting with 1 at the control mode change; and
scale factor is a user-defined scale factor.

15. The method of claim 1, wherein performing the bumpless transfer from the position control mode to a force control mode further comprises switching from a stiff configuration to a minimally stiff configuration.

16. The method of claim 1 wherein increasing a force applied by the robotic tool to the workpiece to a force setpoint comprises linearly increasing the force.

17. The method of claim 1 wherein increasing a force applied by the robotic tool to the workpiece to a force setpoint comprises increasing the force along a user-defined trajectory.

18. A force control device having compliance motion and configured to hold a robotic tool and apply the robotic tool against a workpiece with a desired force, wherein at least one of the robotic tool and the workpiece are configured to move so as to reduce a distance between the robotic tool and the workpiece, comprising:
a controller operative in a position control mode to position the robotic tool along a compliance stroke of the force control device, away from a mechanical stop in the force control device; and
as the distance between the robotic tool and the workpiece is reduced, detect contact between the robotic tool and the workpiece;
the controller further operative in a force control mode to:
increase a force applied by the robotic tool to the workpiece to a force setpoint; wherein the controller is configured to perform a bumpless transfer from the position control mode to the force control mode in response to detecting contact between the robotic tool and the workpiece; and
whereby a force applied by the robotic tool to the workpiece at contact is less than the force setpoint.

19. The force control device of claim 18 further comprising:
a position sensor configured to sense a position of the robotic tool along a compliance motion stroke of the force control device; and
a force sensor configured to sense a force with which the robotic tool contacts the workpiece.

20. The force control device of claim 18 wherein the controller is configured to detect the contact between the robotic tool and the workpiece by a steady state search, comprising:
positioning the robotic tool at an initial search position along a compliance motion stroke of the force control device; and
as the robotic tool and the workpiece move towards each other, the controller is configured to detect the contact between the robotic tool and the workpiece by detecting a change in position of the robotic tool along the compliance motion stroke of the force control device.

21. The force control device of claim 20 wherein the initial search position is within a half of the compliance motion stroke of the force control device towards the workpiece.

22. The force control device of claim 18 wherein the controller is configured to detect the contact between the robotic tool and the workpiece by a steady state search, comprising:
positioning the robotic tool at an initial search position along a compliance motion stroke of the force control device; and
as the robotic tool and the workpiece move towards each other, the controller is configured to detect the contact between the robotic tool and the workpiece by detecting a force with which the robotic tool contacts the workpiece in excess of a predetermined threshold.

23. The force control device of claim 18 wherein the controller is configured to detect the contact between the robotic tool and the workpiece by a transient search, comprising:
- positioning the robotic tool at an initial position along a compliance stroke of the force control device;
- moving the robotic tool along the compliance stroke of the force control device towards the workpiece; and
- detecting the contact between the robotic tool and the workpiece by detecting a force with which the robotic tool contacts the workpiece in excess of a predetermined threshold.

24. The force control device of claim 23 wherein the initial position is past a half-way point of the compliance stroke of the force control device in a direction opposite the workpiece.

25. The force control device of claim 18 wherein the controller is further configured to detect loss of contract between the robotic tool and the workpiece by detecting a position of the robotic tool at along the compliance stroke of the force control device that is a predetermined distance from a mechanical stop closest to the workpiece.

26. The force control device of claim 18 wherein the controller comprises a Proportional-Integral-Derivative (PID) controller, and wherein the PID controller is configured to perform the bumpless transfer from the position control mode to the force control mode by:
- changing a position setpoint value to a force setpoint value having different physical units;
- resetting an internal state of a lowpass setpoint filter; and
- iteratively updating setpoint filter coefficients such that the setpoint filter output reaches the force setpoint value over a plurality of control iterations.

27. The force control device of claim 26, wherein the PID controller is further configured to perform the bumpless transfer from the position control mode to the force control mode by:
- changing an integral gain factor from a position integral gain factor to a force integral gain factor;
- for a transition duration comprising a plurality of control iterations after switching from position control mode to force control mode, ramping a value of an integral term of the PID controller from a value calculated using the position integral gain factor to a value calculated using the force integral gain factor.

28. The force control device of claim 27, wherein ramping a value of an integral term of the PID controller from a value calculated using the position integral gain factor to a value calculated using the force integral gain factor comprises:
- upon switching from the position control mode to the force control mode,
  - copying a current integral term to a memory location allocated for a previous integral term; and
  - resetting the current integral term;
- during the transition duration, at each control iteration,
  - decaying the value of the previous integral term; and
  - setting an integral term of the PID controller to the decayed previous integral term plus the current integral term times the force integral gain factor; and
- after the transition duration, at each control iteration,
  - setting the integral term to the current integral term times the force integral gain factor.

29. The force control device of claim 28, wherein decaying the value of the previous integral term comprises exponentially decaying the value of the previous integral term.

30. The force control device of claim 29, wherein during the transition duration, Integral Term =

$$\frac{1}{(\text{scale factor} * i)^i} * \text{previous integral term} + \text{current integral term} * K_i;$$

and
after the transition duration,
Integral Term = current integral term $*K_i$,
where Ki is the force integral gain factor;
i is the discrete control iteration, starting with 1 at the control mode change; and
scale factor is a user-defined scale factor.

31. The force control device of claim 18, wherein the controller is further configured to assume a stiff configuration in the position control mode and a minimally stiff configuration in the force control mode.

32. The force control device of claim 18, wherein the controller is further operative, upon transitioning from the position control mode to the force control mode, to linearly increase a force applied by the robotic tool to the workpiece to a force setpoint.

33. The force control device of claim 18, wherein the controller is further operative, upon transitioning from the position control mode to the force control mode, to increase a force applied by the robotic tool to the workpiece to a force setpoint by increasing the force along a user-defined trajectory.

* * * * *